(12) United States Patent
Kuroki

(10) Patent No.: US 10,566,923 B2
(45) Date of Patent: *Feb. 18, 2020

(54) MOTOR DRIVE DEVICE INCLUDING PWM CONVERTER CONTROLLED IN BOOSTING RATIO

(71) Applicant: FANUC CORPORATION, Yamanashi (JP)

(72) Inventor: Wataru Kuroki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/112,772

(22) Filed: Aug. 27, 2018

(65) Prior Publication Data

US 2019/0068106 A1 Feb. 28, 2019

(30) Foreign Application Priority Data

Aug. 28, 2017 (JP) .................................. 2017-163163

(51) Int. Cl.
*H02P 27/08* (2006.01)
*H02P 29/024* (2016.01)
(52) U.S. Cl.
CPC ............ *H02P 27/08* (2013.01); *H02P 29/024* (2013.01)
(58) Field of Classification Search
CPC ........ H02P 27/08; H02P 29/024; H02P 23/06; H02P 29/025
See application file for complete search history.

(56) References Cited

U.S. PATENT DOCUMENTS

| 7,279,872 | B2 * | 10/2007 | Hackner | ................. | H02M 1/08 |
| | | | | | 323/266 |
| 8,736,240 | B2 * | 5/2014 | Liu | ....................... | H02M 3/335 |
| | | | | | 307/46 |
| 9,954,426 | B2 * | 4/2018 | Kuroki | ..................... | H02M 1/00 |
| 10,033,264 | B2 * | 7/2018 | Lind | ........................ | H02M 1/36 |
| 10,033,269 | B2 * | 7/2018 | Leong | ..................... | H02M 1/14 |
| 2006/0158197 | A1 * | 7/2006 | Horikoshi | ............ | G01R 31/343 |
| | | | | | 324/551 |

(Continued)

FOREIGN PATENT DOCUMENTS

| CN | 106330056 A | 1/2017 |
| JP | H4-322186 A | 11/1992 |

(Continued)

*Primary Examiner* — Thai T Dinh
(74) *Attorney, Agent, or Firm* — Hauptman Ham, LLP

(57) ABSTRACT

A motor drive device includes a PWM converter configured to convert AC power supplied from an AC power supply into DC power and supply it to a DC link, a DC link capacitor which is provided in the DC link and may store the DC power, an inverter configured to convert the DC power in the DC link into AC power for motor driving and output it, and a boosting ratio control unit configured to control the boosting ratio as the ratio of the value of the DC voltage output from the PWM converter to the peak value of the AC voltage input from the AC power supply, to allow a motor to be driven using AC power output by converting the DC power stored in the DC link capacitor by the inverter during shut-off of supply of the DC power from the PWM converter to the DC link.

6 Claims, 8 Drawing Sheets

(56) References Cited

U.S. PATENT DOCUMENTS

| | | | |
|---|---|---|---|
| 2016/0116925 A1* | 4/2016 | Freeman | H02M 3/33546 |
| | | | 307/130 |
| 2017/0222596 A1* | 8/2017 | Kuroki | H02P 25/03 |
| 2017/0294830 A1* | 10/2017 | Ye | H02M 1/14 |

FOREIGN PATENT DOCUMENTS

| | | |
|---|---|---|
| JP | H10-304668 A | 11/1998 |
| JP | 2002-233187 | 8/2002 |
| JP | 2004-15939 A | 1/2004 |
| JP | 2010-252412 A | 11/2010 |
| JP | 2010-259218 A | 11/2010 |
| JP | 2015-27178 | 2/2015 |
| JP | 2016-144374 A | 8/2016 |
| WO | 2008/087689 A1 | 7/2008 |

\* cited by examiner

MOTOR DRIVE DEVICE INCLUDING PWM CONVERTER CONTROLLED IN BOOSTING RATIO

RELATED APPLICATIONS

The present application claims priority of Japanese Application Number 2017-163163, filed on Aug. 28, 2017, the disclosure of which is hereby incorporated by reference herein in its entirety.

BACKGROUND OF THE INVENTION

1. Field of the Invention

The present invention relates to a motor drive device including a PWM converter controlled in boosting ratio.

2. Description of the Related Art

In a motor drive device which drives motors in a machine tool, forging machinery, an injection molding machine, or various robots, AC power supplied from an AC power supply is temporarily converted into DC power, the DC power is further converted into AC power, and the AC power is used as drive power for the motor provided for each drive axis. The motor drive device includes a converter (rectifier) which rectifies AC power supplied from an AC power supply and outputs DC power, and an inverter which is connected to a DC link on the DC side of the converter and performs mutual power conversion between the DC power of the DC link and the AC power serving as drive power or regenerative power for the motor, and the device controls the speed, the torque, or the rotor position of the motor connected to the AC side of the inverter. A DC link capacitor is provided in the DC link connecting the DC output of the converter to the DC input of the inverter. The DC link capacitor functions as a smoothing capacitor for suppressing pulsation of the DC output of the converter and as an electrical storage device which can store DC power.

In recent years, as a converter for a motor drive device, a PWM-controlled converter (simply referred to as a "PWM converter" hereinafter) which can return regenerative power generated upon motor deceleration to an AC power supply is widely used. The PWM converter is implemented in abridge circuit of semiconductor switching elements and diodes connected in antiparallel with the switching elements and is configured to convert power between the AC power in the AC power supply and the DC power in the DC link by PWM control of the switching operation of the internal semiconductor switching elements. Advantageously, the PWM converter has a power factor nearly equal to 1 and can boost the DC voltage in the DC link to a desired voltage equal to or higher than the peak value of the AC voltage input from the AC power supply. The ratio of the value of the DC voltage output from the PWM converter to the peak value of the AC voltage input from the AC power supply (i.e., (Value of DC Voltage Output from PWM Converter)/(Peak Value of AC Voltage Input from AC Power Supply)× 100 [%]) is called a "boosting ratio." The DC voltage in the DC link can be adjusted to a desired value by controlling the power conversion operation of the PWM converter, based on the boosting ratio.

As disclosed in, e.g., Japanese Unexamined Patent Publication (Kokai) No. H10-304668, a PWM converter device which includes a PWM converter connected to an AC power supply via an AC reactor, a smoothing capacitor connected to a DC side of the PWM converter, and a load device using a voltage of the smoothing capacitor as a voltage source, and controls an input current of the PWM converter to adjust the voltage of the smoothing capacitor to a voltage based on a DC voltage command value is known to include means for indicating a charging current to be supplied to the smoothing capacitor and control the PWM converter to boost the voltage of the smoothing capacitor to a set voltage indicated by the DC voltage command, based on a command of the charging current upon activation.

As disclosed in, e.g., Japanese Unexamined Patent Publication (Kokai) No. 2004-15939, a charging device for a capacitor configured to repeatedly charge a power capacitor having one electrode earthed or grounded to a set voltage is known to include a converter unit which uses a three-phase, three-wire AC power supply having one phase grounded as input, performs rectification and smoothing by a V-connected diode rectifier or PWM converter circuit configuration, and obtains positive and negative DC voltage outputs for the grounded phase of the AC power supply and the grounded electrode of the power capacitor, and a first semiconductor switch which supplies a short-circuit current to a reactor using the positive and negative DC outputs of the converter unit, the device including a non-insulated boosting chopper circuit which supplies a boosted charging current via a charging current path forming diode from the reactor to the power capacitor by OFF control of the semiconductor switch.

As disclosed in, e.g., Japanese Unexamined Patent Publication (Kokai) No. 2016-144374, a motor drive device is known to include a PWM converter which converts AC power input from a low-voltage AC power supply into DC power by PWM control, an inverter which receives the DC power and converts the DC power into AC power for driving a motor, and an electrical storage device connected between the PWM converter and the inverter, wherein the PWM converter reduces a capacity of the electrical storage device by operating to limit an input/output current or an input/output power to a certain set value, being supplied with a voltage lower than a voltage involved in driving the motor from the low-voltage AC power supply, and boosting a DC link voltage serving as an output voltage to a voltage which can drive the motor.

SUMMARY OF INVENTION

When supply of AC power from the AC power supply to the PWM converter is cut off due to power failure, the PWM converter can no longer perform a power conversion operation for converting AC power into DC power, so no DC power is supplied to the DC link. However, since DC power is stored in the DC link capacitor provided in the DC link, the motor can be driven to a certain extent using AC power output by converting the DC power stored in the DC link capacitor by the inverter, even during the power failure of the AC power supply. The length of the period of time (referred to as the "allowable power failure time" hereinafter) in which the motor can be driven using AC power output by converting the DC power stored in the DC link capacitor by the inverter during the power failure of the AC power supply is determined based on the output of the inverter and the amount of DC power stored in the DC link capacitor at the time of occurrence of the power failure. In other words, the allowable power failure time in which the motor can be driven during the power failure of the AC power supply can be said to be one criterion for the resistance of the motor drive device against power failure.

When the PWM converter is controlled at a high boosting ratio in the normal state, if power failure occurs in the AC power supply, since the amount of DC power stored in the DC link capacitor is large at the time of occurrence of the power failure, the allowable power failure time in which the motor can be driven during the power failure of the AC power supply is long. However, disadvantageously, heat is generated in large quantities due to the switching losses of the PWM converter and the inverter. As another disadvantage, heat is generated in large quantities due to resistance components in the motor drive device typified by, e.g., a bleeder resistor, a balancing resistor, and a current limiting resistor for LED lighting, placed on the DC link, and the parasitic resistance of the capacitor.

When the PWM converter is controlled at a low boosting ratio in the normal state, if power failure occurs in the AC power supply, since the amount of DC power stored in the DC link capacitor is small at the time of occurrence of the power failure, the allowable power failure time during the power failure of the AC power supply is disadvantageously short. However, little heat is generated due to the switching losses of the PWM converter and the inverter, and little heat is generated due to the resistance components on the DC link.

In this manner, the motor drive device including a PWM converter traditionally poses a problem: setting the boosting ratio used to control the PWM converter high results in a long allowable power failure time but in a large amount of heat generated due to the switching losses of the PWM converter and the inverter and the resistance components on the DC link, while setting the boosting ratio low results in a small amount of heat generated due to the switching losses of the PWM converter and the inverter and the resistance components on the DC link but in a short allowable power failure time, and, for example, poses a problem: to prolong the allowable power failure time and reduce the amount of heat generated due to the switching losses of the PWM converter and the inverter and the resistance components on the DC link, the capacitance of the DC link capacitor may be enhanced, or a UPS (Uninterruptible Power Supply) or the like may be additionally used, but such approaches increase the cost and the footprint. It is, therefore, desired to realize a motor drive device including a low-cost, small-footprint PWM converter, having a long allowable power failure time and generating little heat due to the switching losses of the PWM converter and the inverter and the resistance components on the DC link.

In one aspect of the present disclosure, a motor drive device includes a PWM converter configured to convert AC power supplied from an AC power supply into DC power by PWM control and supply the DC power to a DC link, a DC link capacitor which is provided in the DC link and configured to store the DC power, an inverter configured to convert the DC power in the DC link into AC power for motor driving and output the AC power, and a boosting ratio control unit configured to control a boosting ratio as a ratio of a value of a DC voltage output from the PWM converter to a peak value of an AC voltage input from the AC power supply, to allow a motor to be driven using AC power output by converting the DC power stored in the DC link capacitor by the inverter during shut-off of supply of the DC power from the PWM converter to the DC link.

BRIEF DESCRIPTION OF THE DRAWINGS

The present invention will be more clearly understood with reference to the following accompanying drawings.

DETAILED DESCRIPTION

Figure 1:
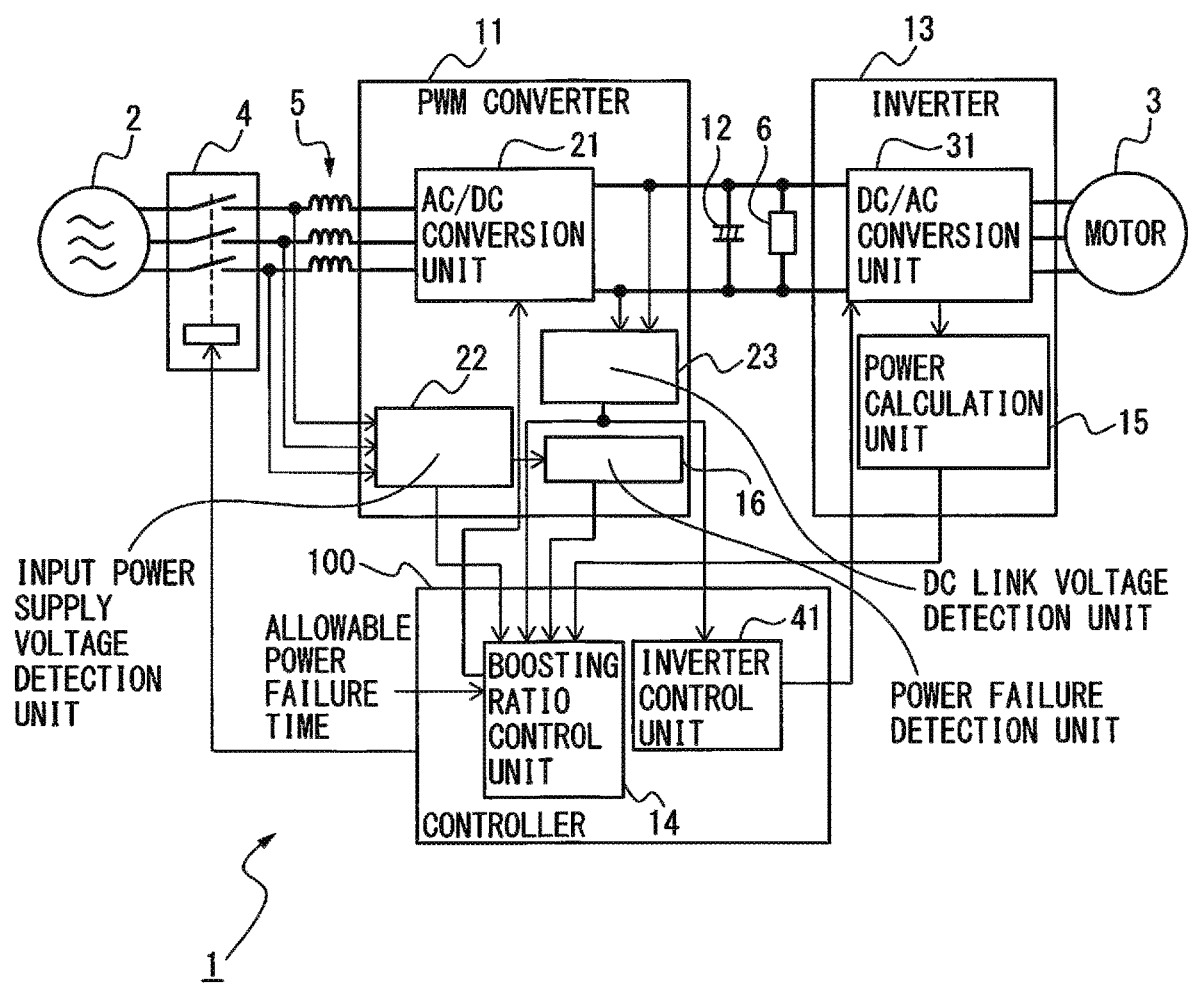
FIG. 1 is a block diagram illustrating a motor drive device according to one embodiment.

A motor drive device including a PWM converter controlled in boosting ratio will be described below with reference to the drawings. However, it should be understood that the present invention is not limited to the drawings or the following embodiments. In the drawings, the same reference numerals denote the same members. These drawings use different scales as appropriate to facilitate an understanding.

FIG. 1 is a block diagram illustrating a motor drive device according to one embodiment. The case where an AC motor (simply referred to as a "motor" hereinafter) 3 is controlled by a motor drive device 1 connected to an AC power supply 2 will be taken as an example herein. The numbers of phases of the AC power supply 2 and the motor 3 do not particularly limit this embodiment, and a three- or single-phase configuration, for example, may be used. In the embodiment illustrated in FIG. 1, the AC power supply 2 is implemented as a three-phase AC power supply, and the motor 3 is implemented as a three-phase AC motor. The type of motor 3 does not particularly limit this embodiment, either, and an induction or synchronous motor, for example, may be used. FIG. 1 does not illustrate an initial charging unit which initially charges the voltage of a DC link capacitor 12, for the sake of simplicity.

The motor drive device 1 according to one embodiment includes a PWM converter 11, a DC link capacitor 12, an inverter 13, and a boosting ratio control unit 14.

The PWM converter 11 converts AC power supplied from the AC power supply 2 into DC power by PWM control and supplies it to a DC link. The PWM converter 11 includes an AC/DC conversion unit 21, an input power supply voltage detection unit 22, a DC link voltage detection unit 23, and a power failure detection unit 16. FIG. 1 illustrates an example in which the input power supply voltage detection unit 22, the DC link voltage detection unit 23, and the power failure detection unit 16 are provided in the PWM converter 11, but some or all of these units may be provided outside the PWM converter 11.

The AC/DC conversion unit 21 in the PWM converter 11 is implemented in a bridge circuit of switching elements and diodes connected in antiparallel with the switching elements and converts power between the AC power in the AC power supply 2 and the DC power in the DC link by ON/OFF control of each switching element in accordance with a drive command based on PWM control received from a controller 100. In the embodiment illustrated in FIG. 1, since the AC power supply 2 serves as a three-phase AC power supply, the AC/DC conversion unit 21 is implemented in a three-phase bridge circuit, while it is implemented in a single-phase bridge circuit when the AC power supply 2 serves as a single-phase AC power supply. Examples of the switching element in the AC/DC conversion unit 21 may include a unipolar transistor such as an FET, a bipolar transistor, an IGBT, a thyristor, and a GTO, but the type of switching element itself does not limit this embodiment, and other types of switching elements may be used. The value of the DC voltage output from the AC/DC conversion unit 21 is controlled by appropriately changing by the boosting ratio control unit 14 (described later), the "boosting ratio" as the ratio of the value of the DC voltage output from the PWM converter 11 to the peak value of the AC voltage input from the AC power supply 2 (i.e., (Value of DC Voltage Output from PWM Converter 11)/(Peak Value of AC Voltage Input from AC Power Supply 2)×100 [%]).

The input power supply voltage detection unit 22 detects the value of the AC voltage input from the AC power supply 2. The value of the AC voltage detected by the input power supply voltage detection unit 22 is sent to the boosting ratio control unit 14 and the power failure detection unit 16.

The DC link voltage detection unit 23 detects the value of the DC voltage output from the PWM converter 11 (i.e., the voltage applied to the DC link capacitor 12). The value of the DC voltage detected by the DC link voltage detection unit 23 is sent to the boosting ratio control unit 14 and an inverter control unit 41.

The power failure detection unit 16 detects power failure in the AC power supply 2, based on the value of the AC voltage input from the AC power supply 2 detected by the input power supply voltage detection unit 22. The "power failure" to be referred to hereinafter means power failure in the AC power supply 2. Criteria for determining power failure by the power failure detection unit 16 include a power failure voltage threshold as a criterion for determining power failure for the AC voltage value in the AC power supply 2 of the motor drive device 1, and a power failure time threshold as the duration of the state in which the AC voltage value in the AC power supply 2 of the motor drive device 1 is smaller than the power failure voltage threshold. The power failure detection unit 16 determines that power failure has occurred, when the value of the AC voltage input from the AC power supply 2, detected by the input power supply voltage detection unit 22, has been kept smaller than the power failure voltage threshold for a period of time corresponding to the power failure time threshold or more.

The determination result obtained by the power failure detection unit 16 is sent to the boosting ratio control unit 14. The power failure detection unit 16 is constructed in, e.g., software program form, and the function of the power failure detection unit 16 is implemented by causing an arithmetic processing unit (not illustrated) provided in the PWM converter 11 to operate in accordance with this software program. Alternatively, the power failure detection unit 16 may be constructed as a combination of various electronic circuits and a software program to form a semiconductor integrated circuit into which a software program for implementing the function of each unit is written. FIG. 1 illustrates an example in which the power failure detection unit 16 is provided in the PWM converter 11, but it may be provided outside the PWM converter 11 and, for example, may be provided in the controller 100. When the power failure detection unit 16 is provided in the controller 100, the power failure detection unit 16 is constructed in software program form, and the function of the power failure detection unit 16 is implemented by causing an arithmetic processing unit in the controller 100 to operate this software program.

An electromagnetic contactor 4 and an AC reactor 5 are connected to the AC input of the PWM converter 11. The electromagnetic contactor 4 opens and closes an electrical path connecting the AC power supply 2 to the PWM converter 11, in accordance with a command received from the controller 100. Examples of the electromagnetic contactor 4 may include a relay and a power semiconductor switching element.

The DC link capacitor 12 is provided in a DC link connecting the DC output of the PWM converter 11 to the DC input of the inverter 13. The DC link capacitor 12 has the functions of storing DC power in the DC link and of suppressing pulsation of the DC output of the PWM converter 11. A bleeder resistor 6, for example, is connected in parallel with the DC link capacitor 12. Not only the bleeder resistor 6 but also resistors such as a balancing resistor and a current limiting resistor for LED lighting may be provided in the DC link.

The inverter 13 is connected to the PWM converter 11 via the DC link. The inverter 13 converts the DC power in the DC link into AC power for motor driving and outputs it. The inverter 13 includes a DC/AC conversion unit 31 and a power calculation unit 15. The power calculation unit 15 is constructed in, e.g., software program form, and the function of the power calculation unit 15 is implemented by causing an arithmetic processing unit (not illustrated) provided in the inverter 13 to operate in accordance with this software program. Alternatively, the power calculation unit 15 may be constructed as a combination of various electronic circuits and a software program to form a semiconductor integrated circuit into which a software program for implementing the function of each unit is written. FIG. 1 illustrates an example in which the power calculation unit 15 is provided in the inverter 13, but it may be provided outside the inverter 13 as a modification to this example and, for example, may be provided in the controller 100. When the power calculation unit 15 is provided in the controller 100, the power calculation unit 15 is constructed in software program form, and the function of the power calculation unit 15 is implemented by causing the arithmetic processing unit in the controller 100 to operate this software program.

The DC/AC conversion unit 31 in the inverter 13 is implemented in, e.g., a bridge circuit of switching elements and diodes connected in antiparallel with the switching elements and converts power between the DC power in the DC link and the AC power serving as drive power or regenerative power for the motor 3 by ON/OFF control of each switching element, based on the drive command received from the inverter control unit 41 in the controller 100. In the embodiment illustrated in FIG. 1, since the motor 3 serves as a three-phase AC motor, the DC/AC conversion unit 31 is implemented in a three-phase bridge circuit, while it is implemented in a single-phase bridge circuit when the motor 3 serves as a single-phase AC motor. Examples of the switching element in the DC/AC conversion unit 31 may include a unipolar transistor such as an FET, a bipolar transistor, an IGBT, a thyristor, and a GTO, but the type of switching element itself does not limit this embodiment, and other types of switching elements may be used. The inverter 13 is controlled by the inverter control unit 41 (described later). More specifically, the DC/AC conversion unit 31 in the inverter 13 performs the switching operation of the internal switching elements, based on the drive command received from the inverter control unit 41, to convert DC power in the DC link into AC power having a desired voltage and a desired frequency for driving the motor 3 (inversion operation). The motor 3 thus operates based on, e.g., the variable-voltage, variable-frequency AC power. Regenerative power may occur during, e.g., deceleration of the motor 3, but in this case, the DC/AC conversion unit 31 in the inverter 13 performs the switching operation of the internal switching elements, based on the drive command received from the inverter control unit 41, to convert the AC regenerative power generated in the motor 3 into DC power and return it to the DC link (conversion operation).

The power calculation unit 15 calculates a driving power requirement as an amount of DC power involved in driving the motor 3 during the allowable power failure time. The processing for calculating a driving power requirement by the power calculation unit 15 will be described in detail later.

The controller 100 includes a boosting ratio control unit 14 and an inverter control unit 41. The boosting ratio control unit 14 and the inverter control unit 41 are constructed in software program form, and the function of each unit is implemented by causing the arithmetic processing unit in the controller 100 to operate this software program.

The boosting ratio control unit 14 controls the boosting ratio to allow the motor to be driven using AC power output by converting the DC power stored in the DC link capacitor 12 by the inverter 13 during shut-off of supply of DC power from the PWM converter 11 to the DC link. In other words, the boosting ratio control unit 14 controls the boosting ratio, based on an allowable power failure time set in advance as a period of time in which the motor 3 is allowed to be driven using the AC power output from the inverter 13 during shut-off of supply of DC power from the PWM converter 11 to the DC link due to power failure in the AC power supply 2. The boosting ratio control unit 14 controls the boosting ratio using, e.g., the PWM control scheme. Control of the boosting ratio by the boosting ratio control unit 14 will be described in detail later.

The inverter control unit 41 controls the inverter 13 that converts power between the DC power in the DC link and the AC power serving as drive power or regenerative power for the motor 3. The inverter control unit 41 generates a drive command for controlling the speed, the torque, or the rotor position of the motor 3, based on, e.g., the (rotor) speed (speed feedback) of the motor 3 detected by a speed detector (not illustrated), a current flowing through the windings of the motor 3 (current feedback), a predetermined torque command, and an operation program for the motor 3. The power conversion operation by the inverter 13 is controlled based on the drive command generated by the inverter control unit 41. The inverter control unit 41 controls the inverter 13 using, e.g., the PWM control scheme. The configuration of the inverter control unit 41 defined herein is merely illustrative, and the configuration of the inverter control unit 41 may be defined including terms such as a position command generation unit, a torque command generation unit, and a switching command generation unit.

Control of the boosting ratio by the boosting ratio control unit 14 will be described in more detail subsequently.

When power failure occurs in the AC power supply 2 and supply of DC power from the PWM converter 11 to the DC link is cut off, as long as the motor 3 can be driven using only AC power output by converting the DC power stored in the DC link capacitor 12 by the inverter 13 until the power failure in the AC power supply 2 is resolved, the motor 3 can continue to be driven even upon the power failure of the AC power supply 2. In this embodiment, the allowable power failure time is set in advance as a period of time in which the motor 3 is allowed to be driven using the AC power output from the inverter 13 during shut-off of supply of DC power from the PWM converter 11 to the DC link due to power failure in the AC power supply 2. The boosting ratio control unit 14 controls the boosting ratio so that even if power failure occurs in the AC power supply 2 and supply of DC power from the PWM converter 11 to the DC link is cut off, power in an amount sufficient to drive the motor 3 during at least the allowable power failure time is stored in the DC link capacitor 12. Such control of the boosting ratio by the boosting ratio control unit 14 is always performed regardless of the normal state or the state in which power failure has occurred in the AC power supply 2. Therefore, even if power failure occurs in the AC power supply 2 and supply of DC power from the PWM converter 11 to the DC link is cut off, as long as the period of time in which the supply of DC power is cut off is equal to or shorter than the allowable power failure time, the motor 3 continues to be driven using AC power output by converting the DC power stored in the DC link capacitor 12 by the inverter 13.

Letting $V_2$ [V] be the value of the DC voltage of the DC link capacitor 12 at the point of time immediately after power failure occurs in the AC power supply 2, and C [F] be the electrostatic capacitance of the DC link capacitor 12, the amount of power $W_f$ [J] stored in the DC link capacitor 12 at the point of time immediately after the power failure occurs is given by the following equation (1).

[Equation 1]

$$Wf = \frac{1}{2} \times C \times V_2^2 \; [J] \tag{1}$$

Letting $V_1$ [V] be the minimum value of the DC voltage of the DC link capacitor 12 involved in driving the motor 3, the amount of DC power $W_m$ [J] stored in the DC link capacitor 12 available to drive the motor 3, during an allowable power failure time T set in advance, is given by the following equation (2). In other words, the amount of power $W_m$ [J] presented in equation (2) means the amount of power consumed by the motor 3, driven based on the DC power stored in the DC link capacitor 12 (to be more precise, the AC power generated by converting this DC power by the inverter 13), in the interval from the occurrence of power failure until the elapse of the allowable power failure time T if the power failure occurs and supply of DC power from the PWM converter 11 to the DC link is cut off. More specifically, a DC power of $\tfrac{1}{2} \times CV_2^2$ has been stored in the DC link capacitor 12 at the point of time immediately after power failure occurs, and a DC power of $\tfrac{1}{2} \times CV_1^2$ has been stored at the point of time when the allowable power failure time T elapses.

[Equation 2]

$$Wm = \frac{1}{2} \times C \times (V_2^2 - V_1^2) \ [J] \tag{2}$$

Letting $W_s$ [J] be the driving power requirement as the amount of power involved in allowing the motor 3 to continue to be driven during the allowable power failure time T when supply of DC power from the PWM converter 11 to the DC link is cut off due to power failure, a relation given by the following equation (3)

[Equation 3]

$$Wm \geq Ws \tag{3}$$

may be preferably satisfied.

From relations equation (2) and equation (3), the value $V_2$ [V] of the DC voltage of the DC link capacitor 12 at the point of time immediately after power failure occurs to allow the motor 3 to continue to be driven during the allowable power failure time T when supply of DC power from the PWM converter 11 to the DC link is cut off due to power failure may preferably satisfy a relation given by the following equation (4).

[Equation 4]

$$\frac{1}{2} \times C \times (V_2^2 - V_1^2) \geq Ws \tag{4}$$

$$V_2^2 \geq \frac{CV_1^2 + 2Ws}{C}$$

$$V_2 \geq \sqrt{\frac{CV_1^2 + 2Ws}{C}}$$

The value $V_2$ [V] of the DC voltage of the DC link capacitor 12 at the point of time immediately after power failure occurs in the AC power supply 2 is given by the following equation (5)

[Equation 5]

$$V_2 = \frac{A}{100} \times V_3 \tag{5}$$

where $V_3$ [V] is the peak value of the AC voltage input from the AC power supply 2, and A [%] is the boosting ratio of the PWM converter 11.

Substituting equation (4) into equation (5) yields equation (6).

[Equation 6]

$$\frac{A}{100} \times V_3 \geq \sqrt{\frac{CV_1^2 + 2Ws}{C}} \tag{6}$$

$$A \geq \sqrt{\frac{CV_1^2 + 2Ws}{V_3 \sqrt{C}}} \times 100 \ [\%]$$

Hence, to allow the motor 3 to continue to be driven during the allowable power failure time T when supply of DC power from the PWM converter 11 to the DC link is cut off due to power failure, it suffices to set the boosting ratio A of the PWM converter 11 to a value satisfying equation (6). The boosting ratio control unit 14 according to this embodiment controls the boosting ratio A in accordance with equation (6), regardless of the normal state or the state in which power failure has occurred, so that even if supply of DC power from the PWM converter 11 to the DC link is cut off due to power failure, power in an amount sufficient to drive the motor 3 during at least the allowable power failure time T is stored in the DC link capacitor 12. In other words, when the boosting ratio control unit 14 controls the boosting ratio A in accordance with equation (6), it means that the boosting ratio control unit 14 controls the boosting ratio A in accordance with equation (3) so that the amount of DC power $W_m$ stored in the DC link capacitor 12 and available to drive the motor 3 during the allowable power failure time T is larger than the driving power requirement $W_s$ that is the amount of power involved in allowing the motor 3 to continue to be driven during the allowable power failure time T. Even if supply of DC power from the PWM converter 11 to the DC link is cut off due to power failure, as long as the period of time in which the supply of DC power is cut off is equal to or shorter than the allowable power failure time T, the motor 3 can be driven using AC power output by converting the DC power stored in the DC link capacitor 12 by the inverter 13.

The processing for calculating a driving power requirement $W_s$ by the power calculation unit 15 will be described in more detail subsequently.

The power calculation unit 15 calculates a driving power requirement $W_s$ as an amount of DC power involved in driving the motor 3 during the allowable power failure time T. The driving power requirement $W_s$ can be calculated based on the inverter output or the motor output.

According to the calculation method using the inverter output, the power calculation unit 15 calculates a driving power requirement $W_s$ [J] based on the total volume of power output from the inverter 13 during the allowable power failure time T. Letting i(t) [A] be the alternating current output from the inverter 13 at time t, and v(t) [V] be the AC voltage, the output $P_i(t)$ [W] of the inverter 13 is given by the following equation (7).

[Equation 7]

$$P_i(t) = i(t) \times v(t) \ [W] \tag{7}$$

Hence, the driving power requirement $W_s$ during the allowable power failure time T is given by the following equation (8).

[Equation 8]

$$Ws = \int_{T_0}^{T_0 + T} P_i(t) dt \ [J] \tag{8}$$

According to the calculation method using the inverter output, the power calculation unit 15 calculates a driving power requirement $W_s$ by integrating the power $P_i(t)$ output from the inverter 13 over the allowable power failure time T, as presented in equation (8).

According to the calculation method using the motor output, the power calculation unit 15 calculates a driving power requirement $W_s$ [J] based on the total volume of output of the motor 3 during the allowable power failure time T. The output $P_m(t)$ [W] of the motor 3 is given by the following equation (9)

[Equation 9]

$$P_m(t) = \omega(t) \times N(t) \times 2\pi/60 [W] \qquad (9)$$

where $\omega(t)$ [rpm] is the rotation speed of the motor 3 and $N(t)$ [N·m] is the torque at time t.

Hence, the driving power requirement $W_s$ during the allowable power failure time T is given by the following equation (10).

[Equation 10]

$$Ws = \int_{T_0}^{T_0+T} P_m(t)\,dt [J] \qquad (10)$$

According to the calculation method using the motor output, the power calculation unit 15 calculates a driving power requirement $W_s$ by integrating the output $P_m(t)$ of the motor 3 over the allowable power failure time T, as presented in equation (10).

Examples of control of the boosting ratio by the boosting ratio control unit 14 will be listed below. The case where a driving power requirement $W_s$ is calculated using the inverter output will be described in the following examples, but the same applies when a driving power requirement $W_s$ is calculated using the motor output.

In the first example, in the processing for calculating a driving power requirement $W_s$ by the power calculation unit 15, the amount of computation by the boosting ratio control unit 14 is kept less assuming that the output $P_i(t)$ of the inverter 13 presented in equation (7) takes an approximately constant value. In other words, the driving power requirement $W_s$ presented in equation (8) is simplified as "Value (Constant Value) of Output of Inverter 13 at Time $t_{start}$× Allowable Power Failure Time T."

Figure 2:
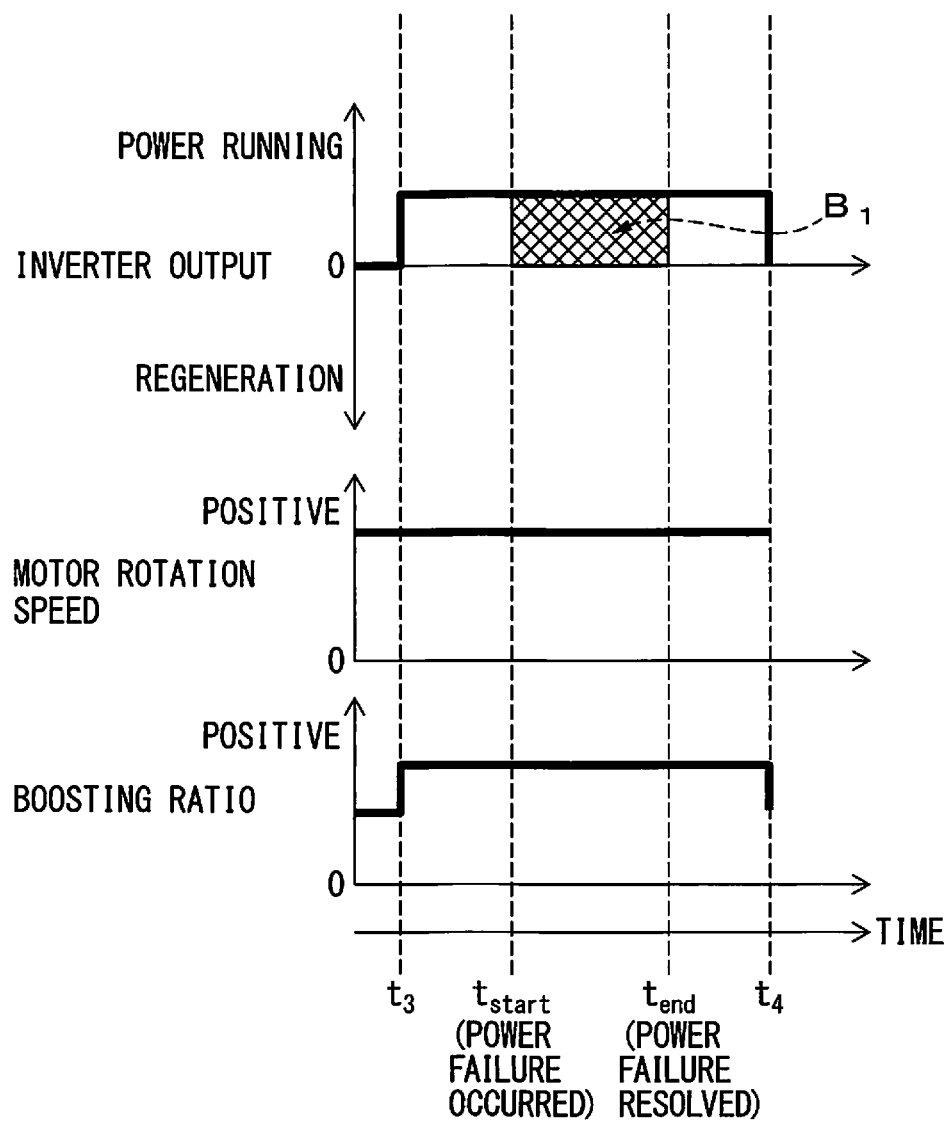
FIG. 2 is a timing chart illustrating an exemplary relationship among the inverter output (driving power requirement) involved in driving a motor, the motor rotation speed, and the boosting ratio when power failure occurs upon rotation of the motor at a constant speed in a first example.

FIG. 2 is a timing chart illustrating an exemplary relationship among the inverter output (driving power requirement) involved in driving a motor, the motor rotation speed, and the boosting ratio when power failure occurs upon rotation of the motor at a constant speed in the first example. Control of the boosting ratio by the boosting ratio control unit 14 that can rotate the motor 3 at a constant speed even when supply of DC power from the PWM converter 11 to the DC link is cut off due to power failure occurring within the length from time $t_{start}$ to time tend in the interval from time $t_3$ to time $t_4$ will be taken as an example herein. As the allowable power failure time T, a value larger than the length corresponding to the power failure duration from time $t_{start}$ to time $t_{end}$ is set. In the first example, the power calculation unit 15 calculates a driving power requirement $W_s$ as "Value (Constant Value) of Output of Inverter 13 at Time $t_{start}$× Allowable Power Failure Time T" assuming that the output $P_i(t)$ of the inverter 13 takes an approximately constant value. The driving power requirement $W_s$ calculated by the power calculation unit 15 corresponds to a region $B_1$ represented in FIG. 2. This means that the power stored in the DC link capacitor 12 at the time of occurrence of the power failure is sufficient in amount to rotate the motor 3 at a constant speed under the control of the boosting ratio A by the boosting ratio control unit 14 using the driving power requirement $W_s$ expressed as "Value (Constant Value) of Output of Inverter 13 at Time $t_{start}$×Allowable Power Failure Time T" calculated assuming that the output $P_i(t)$ of the inverter 13 takes an approximately constant value. Therefore, in rotating the motor 3 at a constant speed, the boosting ratio control unit 14 can continue to drive the motor 3 even if power failure to settle within the allowable power failure time T occurs, as long as the boosting ratio A is controlled so that the amount of DC power $W_m$ stored in the DC link capacitor 12 and available to drive the motor 3 is larger than the driving power requirement $W_s$.

Figure 3:
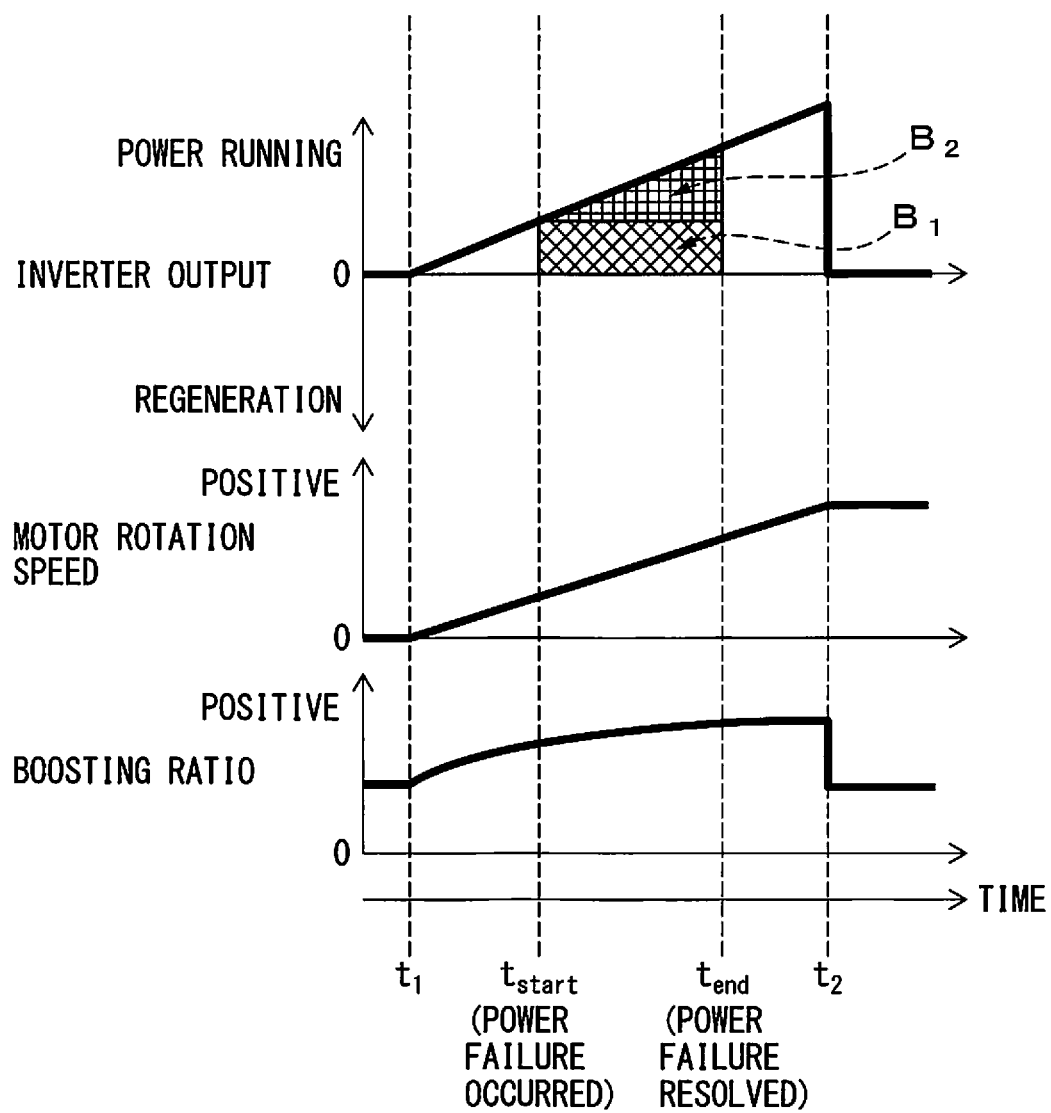
FIG. 3 is a timing chart illustrating an exemplary relationship among the inverter output (driving power requirement) involved in driving a motor, the motor rotation speed, and the boosting ratio when power failure occurs in accelerating the motor in the first example.

FIG. 3 is a timing chart illustrating an exemplary relationship among the inverter output (driving power requirement) involved in driving a motor, the motor rotation speed, and the boosting ratio when power failure occurs in accelerating the motor in the first example. Control of the boosting ratio by the boosting ratio control unit 14 that can accelerate the motor 3 even when supply of DC power from the PWM converter 11 to the DC link is cut off due to power failure occurring within the length from time $t_{start}$ to time $t_{end}$ in the interval from time $t_1$ to time $t_2$ to accelerate the motor 3 will be taken as an example herein. In the first example, the power calculation unit 15 calculates a driving power requirement $W_s$ assuming that the output $P_i(t)$ of the inverter 13 takes an approximately constant value, and the driving power requirement $W_s$ corresponds to a region $B_1$, as represented in FIG. 3. However, since the output of the inverter 13 may be preferably raised, as illustrated in FIG. 3, to accelerate the motor 3 in the interval from time $t_1$ to time $t_2$, the amount of power corresponding to a region $B_2$ is lacking to accelerate the motor 3. Therefore, in accelerating the motor 3, the motor 3 may not be driven at a time before time $t_{end}$ due to the shortage of the amount of power in the region $B_2$. Under the circumstances, in accelerating the motor 3, the boosting ratio control unit 14 controls the boosting ratio A to supplement the amount of power $W_m$ [J] stored in the DC link capacitor 12 presented in equation (2) with the amount of power corresponding to the region $B_2$ and lacking to drive the motor 3. More specifically, the following two approaches, for example, are possible.

In, for example, accelerating the motor 3, the boosting ratio control unit 14 controls the boosting ratio A to store in the DC link capacitor 12, power in an amount obtained by adding the amount of power $M_1$ (>0) [J] corresponding to the region $B_2$ to the amount of power $W_m$ [J] stored in the DC link capacitor 12 presented in equation (2), as the following equation (11). In other words, in controlling the boosting ratio A by the boosting ratio control unit 14, the amount of power presented in equation (11) is used as the amount of DC power $W_m$ stored in the DC link capacitor 12 and available to drive the motor 3.

[Equation 11]

$$Wm = \frac{1}{2} \times C \times (V_2^2 - V_1^2) + M_1 \; [J] \qquad (11)$$

Further, in, for example, accelerating the motor 3, to perform supplementation with the lacking amount of power corresponding to the region $B_2$, the boosting ratio control unit 14 controls the boosting ratio A to store in the DC link capacitor 12, power in an amount obtained by multiplying the amount of power $W_m$ [J] stored in the DC link capacitor 12 presented in equation (2) by $M_2$ (>1), as the following equation (12). In other words, in controlling the boosting ratio A by the boosting ratio control unit 14, the amount of power presented in equation (12) is used as the amount of DC power $W_m$ stored in the DC link capacitor 12 and available to drive the motor 3.

[Equation 12]

$$Wm = \frac{1}{2} \times C \times (V_2^2 - V_1^2) + M_2 \quad [J] \qquad (12)$$

In this manner, in accelerating the motor 3, the boosting ratio control unit 14 controls the boosting ratio A to store in the DC link capacitor 12, power in the amount $W_m$ as presented in equation (11) or (12). By this control, even in accelerating the motor 3, since the amount of DC power $W_m$ stored in the DC link capacitor 12 and available to drive the motor 3 is larger than the driving power requirement $W_s$, the motor 3 can continue to be driven even if power failure to settle within the allowable power failure time T occurs.

Figure 4:
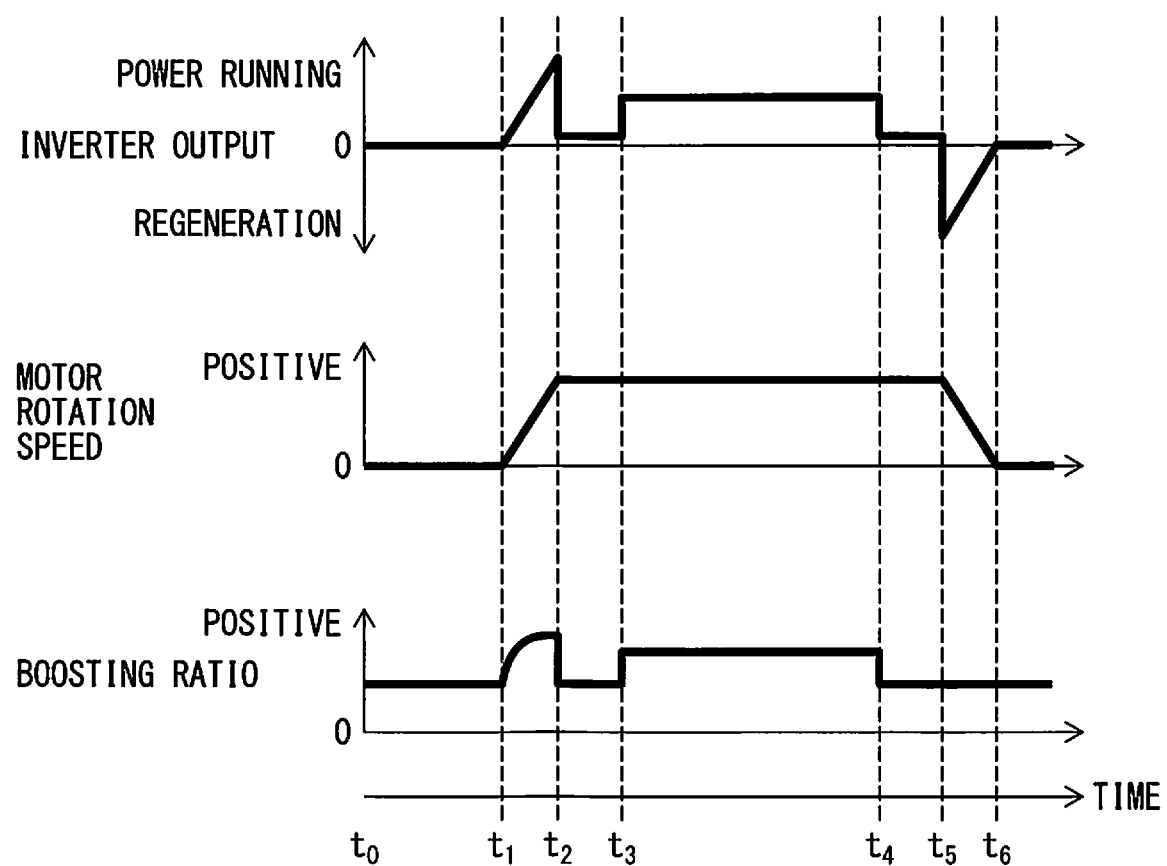
FIG. 4 is a timing chart illustrating an exemplary relationship among the inverter output (driving power requirement) involved in driving a motor, the motor rotation speed, and the boosting ratio when a motor drive device according to the first example is mounted in a cutting machine.

FIG. 4 is a timing chart illustrating an exemplary relationship among the inverter output (driving power requirement) involved in driving a motor, the motor rotation speed, and the boosting ratio when a motor drive device according to the first example is mounted in a cutting machine. The case where a cutting machine incorporating a motor drive device according to the first example is operated in the following divided periods will be taken as an example herein. Referring to FIG. 4, the interval from time $t_0$ to time $t_1$ is defined as an OFF period in which the motor 3 is kept fully stopped, and the interval from time $t_1$ to time $t_2$ is defined as an acceleration period in which the motor 3 is accelerated to a rotation speed suitable for cutting. The interval from time $t_2$ to time $t_3$ is defined as a standby period in which the motor 3 is ready for cutting at time $t_3$ upon reaching a rotation speed suitable for cutting, and the interval from time $t_3$ to time $t_4$ is defined as a machining period in which cutting is performed while the motor 3 keeps the rotation speed suitable for cutting. The interval from time $t_4$ to time $t_5$ is defined as an end preparation period in which cutting has been ended and the motor 3 keeps the rotation speed suitable for cutting, the interval from time $t_5$ to time $t_6$ is defined as a deceleration period in which the motor 3 is decelerated, and the interval from time $t_6$ onward is defined as an OFF period in which the motor 3 is kept fully stopped.

During the OFF period from time $t_0$ to time $t_1$, since the motor 3 is kept stopped, the inverter 13 may preferably supply no drive power to the motor 3. During this period, desirably, the boosting ratio control unit 14 controls the boosting ratio A at a constant value, and the boosting ratio A is as low as possible to keep heat generated in the motor drive device 1 less.

During the acceleration period from time $t_1$ to time $t_2$, the inverter 13 increases the output to accelerate the motor 3 under the control of the inverter control unit 41. This increases the inverter output (driving power requirement) involved in driving the motor, as described with reference to FIG. 3. The boosting ratio control unit 14 raises the boosting ratio A accordingly, and during this period, it raises the boosting ratio A to store in the DC link capacitor 12, power in the amount $W_m$ as presented in equation (11) or (12). By this control, even in accelerating the motor 3, since the amount of DC power $W_m$ stored in the DC link capacitor 12 and available to drive the motor 3 is larger than the driving power requirement $W_s$, the motor 3 can continue to be driven even if power failure to settle within the allowable power failure time T occurs.

During the standby period from time $t_2$ to time $t_3$, the motor 3 has reached a rotation speed suitable for cutting, but the load of the motor 3 is light because cutting is not yet performed. Therefore, the inverter 13 has its output reduced to the degree that the motor 3 keeps the rotation speed suitable for cutting at a light load, under the control of the inverter control unit 41. During this period, the boosting ratio control unit 14 controls the boosting ratio A so that the amount of DC power $W_m$ stored in the DC link capacitor 12 and available to drive the motor 3 is larger than the driving power requirement $W_s$, as described with reference to FIG. 2. In the example illustrated in FIG. 4, since the output of the inverter 13 reduces, the boosting ratio A also reduces, but the boosting ratio A at, e.g., time $t_2$ may be maintained without being reduced, in preparation for cutting to be started at time $t_3$.

During the machining period from time $t_3$ to time $t_4$, since the load of the motor 3 increases upon cutting, the inverter 13 keeps a high output under the control of the inverter control unit 41 to maintain the motor 3 at the rotation speed suitable for cutting. The boosting ratio control unit 14 sets the boosting ratio A high accordingly. During this period, the boosting ratio control unit 14 controls the boosting ratio A so that the amount of DC power $W_m$ stored in the DC link capacitor 12 and available to drive the motor 3 is larger than the driving power requirement $W_s$, as described with reference to FIG. 2.

During the end preparation period from time $t_4$ to time $t_5$, since cutting has been ended, the load of the motor 3 is light. Therefore, the inverter 13 has its output reduced to the degree that the motor 3 keeps the rotation speed suitable for cutting at a light load, under the control of the inverter control unit 41. The boosting ratio control unit 14 sets the boosting ratio A low accordingly. Even during this period, the boosting ratio control unit 14 controls the boosting ratio A so that the amount of DC power $W_m$ stored in the DC link capacitor 12 and available to drive the motor 3 is larger than the driving power requirement $W_s$, as described with reference to FIG. 2.

During the deceleration period from time is to time $t_6$, the inverter 13 converts AC regenerative power generated upon deceleration of the motor 3 into DC power and returns it to the DC link under the control of the inverter control unit 41. During this period, the energy regenerated from the motor 3 is stored in the DC link capacitor 12, and the boosting ratio control unit 14 may return the energy regenerated from the motor 3 to the AC power supply 2 via the PWM converter 11 by maintaining or reducing the boosting ratio A, or may store the energy regenerated from the motor 3 in the DC link capacitor 12 by increasing the boosting ratio A.

The operation of the boosting ratio control unit 14 during the OFF period from time $t_6$ onward is the same as that during the OFF period from time $t_0$ to time $t_1$.

The second example of control of the boosting ratio by the boosting ratio control unit 14 will be described subsequently. In the second example, control of the boosting ratio by the boosting ratio control unit 14 in the above-described first example is employed when the driving power requirement $W_s$ is low, and the boosting ratio control unit 14 controls the boosting ratio A upon setting the driving power requirement $W_s$ to the maximum value (constant value) of the output of the inverter 13 when the driving power requirement $W_s$ is high.

Figure 5:
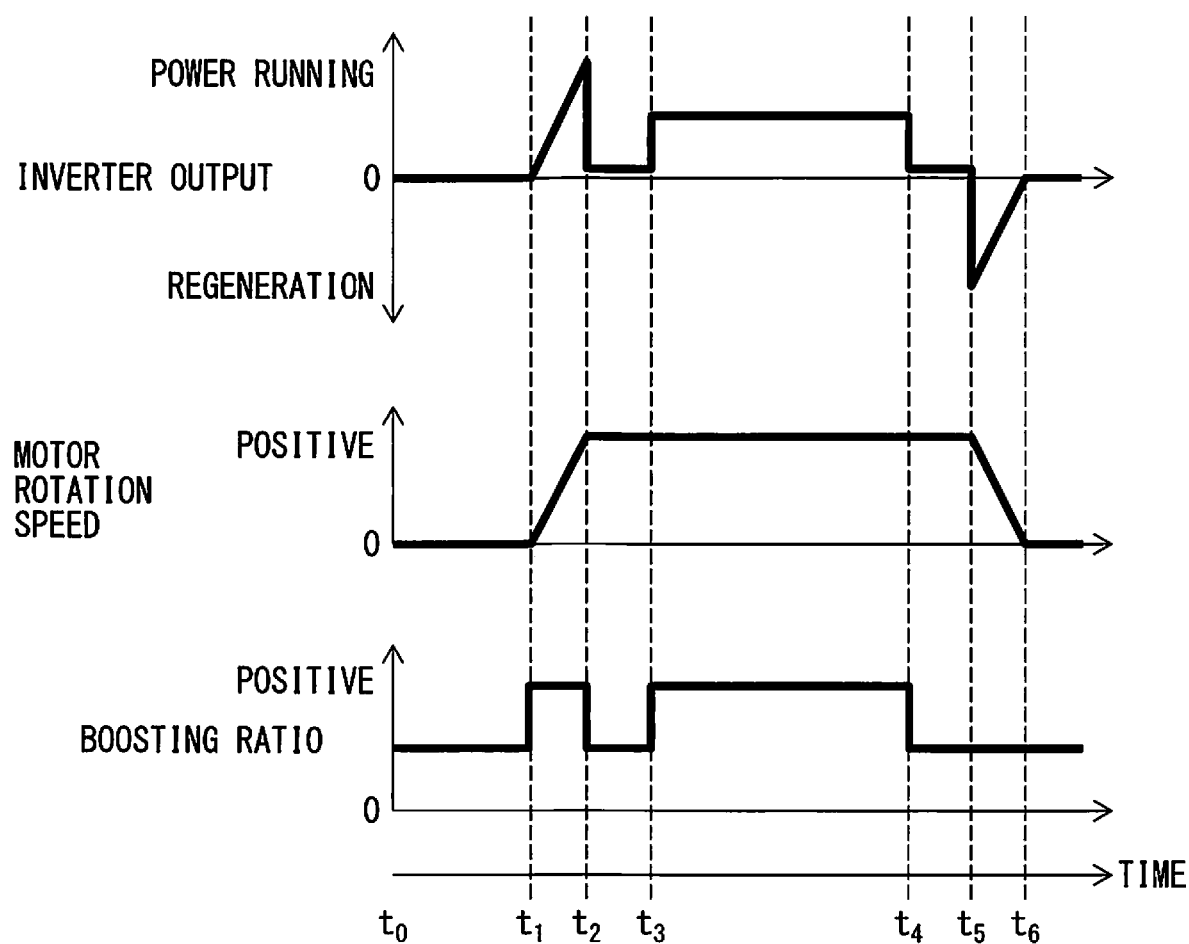
FIG. 5 is a timing chart illustrating an exemplary relationship among the inverter output (driving power requirement) involved in driving a motor, the motor rotation speed, and the boosting ratio when a motor drive device according to a second example is mounted in a cutting machine.

FIG. 5 is a timing chart illustrating an exemplary relationship among the inverter output (driving power requirement) involved in driving a motor, the motor rotation speed, and the boosting ratio when a motor drive device according to the second example is mounted in a cutting machine. The case where a cutting machine incorporating a motor drive device according to the second example is operated in the same way as in the cutting machine according to the above-described first example illustrated in FIG. 4 will be taken as an example herein. As a threshold used for determination processing, a value that is larger than the driving power requirement $W_s$ during the standby period from time $t_2$ to time $t_3$ and smaller than the driving power requirement $W_s$ during the acceleration period from time $t_1$ to time $t_2$ or the machining period from time $t_3$ to time $t_4$, for example, is set in advance. The boosting ratio control unit 14 determines whether the output of the inverter 13 is higher than the threshold. When the driving power requirement $W_s$ is higher than the threshold, the boosting ratio control unit 14 sets the driving power requirement $W_s$ to the maximum value (constant value) of the output of the inverter 13 and controls the boosting ratio A.

In the example illustrated in FIG. 5, during the acceleration period from time $t_1$ to time $t_2$ and the machining period from time $t_3$ to time $t_4$ among the respective operation periods of the cutting machine, the output of the inverter 13 is higher than the threshold. Hence, during these periods, the boosting ratio control unit 14 controls the boosting ratio A, as illustrated in FIG. 5, upon setting the driving power requirement $W_s$ to the maximum value (constant value) of the output of the inverter 13. In particular, as for the acceleration period from time $t_1$ to time $t_2$, the boosting ratio A is increased with an increase in output of the inverter 13 in the first example, while the driving power requirement $W_s$ is set to the maximum value (constant value) of the output of the inverter 13 in the second example, and the boosting ratio A therefore takes a constant value. In the example illustrated in FIG. 5, the boosting ratio A equals during the acceleration period from time $t_1$ to time $t_2$ and during the machining period from time $t_3$ to time $t_4$, but it may differ. During the OFF period from time $t_0$ to time $t_1$, the standby period from time $t_2$ to time $t_3$, the end preparation period from time $t_4$ to time $t_5$, the deceleration period from time $t_5$ to time $t_6$, and the OFF period from time $t_6$ onward, since the output of the inverter 13 is lower than the threshold, the boosting ratio control unit 14 controls the boosting ratio A in the same way as described in the first example.

In this manner, in the second example, when the driving power requirement $W_s$ is higher than a predetermined threshold, the driving power requirement $W_s$ is set to the maximum value (constant value) of the output of the inverter 13, and the boosting ratio control unit 14 controls the boosting ratio A. As the maximum value of the output of the inverter 13 set when the driving power requirement $W_s$ is higher than a predetermined threshold, the maximum output of the inverter 13 itself may be used, or a maximum value which can be output from the inverter 13 upon mounting in the motor drive device 1 may be used. Especially in the latter, a theoretical value may be used, an actual measured value of the maximum value of the output of the inverter 13 mounted in the motor drive device 1 may be used, or any fixed value may be used. In the second example, advantageously, it is hardly probable that the power involved in driving the motor 3 will run short, as described with reference to FIG. 3 regarding the first example, although the PWM converter 11 generates heat more than in the first example.

Figure 6:
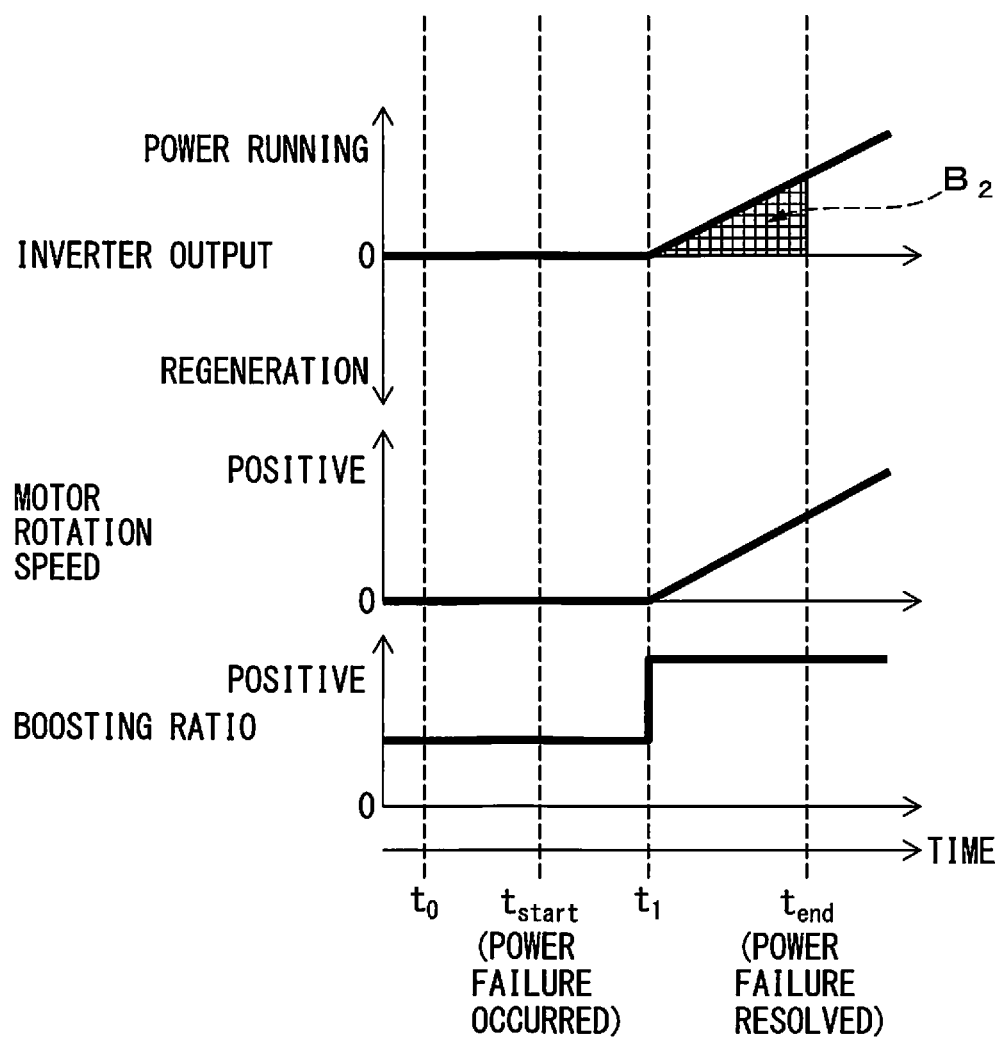
FIG. 6 is a timing chart illustrating an exemplary relationship among the inverter output (driving power requirement) involved in driving a motor, the motor rotation speed, and the boosting ratio if power failure occurs in an AC power supply before and after the start of acceleration of the motor when the motor drive device according to the second example is mounted in the cutting machine.

FIG. 6 is a timing chart illustrating an exemplary relationship among the inverter output (driving power requirement) involved in driving a motor, the motor rotation speed, and the boosting ratio if power failure occurs in an AC power supply before and after the start of acceleration of the motor when the motor drive device according to the second example is mounted in the cutting machine. As illustrated in, e.g., FIG. 6, assume that power failure occurs in the AC power supply 2 at time $t_{start}$ before time $t_1$ when the motor 3 starts to accelerate, and is resolved at time $t_{end}$ after time $t_1$. In the example illustrated in FIG. 6, the threshold is set to zero, for the sake of simplicity. In the second example, when the driving power requirement $W_s$ is higher than the threshold, the driving power requirement $W_s$ is set to the maximum value (constant value) of the output of the inverter 13, and the boosting ratio control unit 14 controls the boosting ratio A, as described above. In the example illustrated in FIG. 6, at time $t_1$, to accelerate the motor 3, the output of the inverter 13 increases under the control of the inverter control unit 41. Since the output of the inverter 13 is higher than the threshold (zero), the boosting ratio control unit 14 sets the driving power requirement $W_s$ to the maximum value (constant value) of the output of the inverter 13 and controls the boosting ratio A. Since the boosting ratio A rises in preparation for power failure during the acceleration period of the motor 3 at time $t_1$ and later, when power failure occurs before and after time $t_1$, the amount of power corresponding to the region $B_2$ is lacking to accelerate the motor 3, because the boosting ratio A has not yet risen in the interval from time $t_{start}$ to time $t_1$. To solve this problem, for example, before time $t_1$ when the motor 3 starts to accelerate, the boosting ratio A starts to be controlled upon setting of the driving power requirement $W_s$ to the maximum value (constant value) of the output of the inverter 13 to ensure power involved in accelerating the motor 3. In this case, it suffices, for example, to start control of the boosting ratio A by the boosting ratio control unit 14 upon outguessing of the point of time when the motor 3 starts to accelerate, in accordance with an operation program for driving the motor 3, or to determine by preliminary simulation or experiment, the timing (in the example illustrated in FIG. 6, time $t_1$) of an increase in output of the inverter 13 to accelerate the motor 3 and then predefine in an operation program for the boosting ratio control unit 14, the timing of control of the boosting ratio A upon setting of the driving power requirement $W_s$ to the maximum value (constant value) of the output of the inverter 13. The boosting ratio control unit 14 may even control the boosting ratio A in accordance with, e.g., equation (11) or (12) in accelerating the motor 3, as described with reference to FIG. 3.

The third example of control of the boosting ratio by the boosting ratio control unit 14 will be described subsequently. In the above-described first and second examples, the boosting ratio control unit 14 controls the boosting ratio A using a driving power requirement $W_s$ set assuming that the output of the inverter 13 takes an approximately constant value. In contrast to this, in the third example, the boosting ratio control unit 14 controls the boosting ratio A using a driving power requirement $W_s$ calculated in correspondence with temporal changes in output $P_i(t)$ of the inverter 13 presented in equation (7). In the first and second examples involving the approximation of the driving power requirement $W_s$, it is probable that the power for driving the motor 3 will run short, depending on the timing when power failure occurs in accelerating the motor 3. To tackle such a problem in accelerating the motor 3, in the first example, the boosting ratio control unit 14 controls the boosting ratio A to store in the DC link capacitor 12, power in the amount $W_m$ as presented in equation (11) or (12), while in the second example, the boosting ratio control unit 14 controls the boosting ratio A upon outguessing of the point of time when the motor 3 starts to accelerate, or the boosting ratio control unit 14 controls the boosting ratio A to store in the DC link capacitor 12, power in the amount $W_m$ as presented in equation (11) or (12). In contrast to this, in the third example, the boosting ratio control unit 14 controls the boosting ratio A using a driving power requirement $W_s$ calculated in correspondence with temporal changes in output $P_i(t)$ of the inverter 13 presented in equation (7). By this control, since the power for driving the motor 3 does not run short even if power failure occurs at any timing, and no excess power may be preferably ensured, heat generated in the motor drive device 1 can be kept less.

When the boosting ratio control unit 14 controls the boosting ratio A by directly using a driving power requirement $W_s$ calculated in correspondence with temporal changes in output $P_i(t)$ of the inverter 13, the temporal change in output $P_i(t)$ of the inverter 13 nearly directly corresponds to the temporal change in boosting ratio A, and the boosting ratio A is therefore controlled upon outguessing of the temporal change in output $P_i(t)$ of the inverter 13 in the third example. For example, a driving power requirement $W_s$ based on equation (8) is calculated in advance by actually operating the motor 3 in accordance with an operation program for driving the motor 3 to actually measure the temporal change in output $P_i(t)$ of the inverter 13, or by performing the computational simulated operation of an operation program for driving the motor 3 to determine the temporal change in output $P_i(t)$ of the inverter 13, and an operation program associated with control of the boosting ratio A using the driving power requirement $W_s$ is created in advance. Such a simulation may be performed by the controller 100 in place of a computer, and in this case, the boosting ratio A may be controlled concurrently with the simulation.

Figure 7:
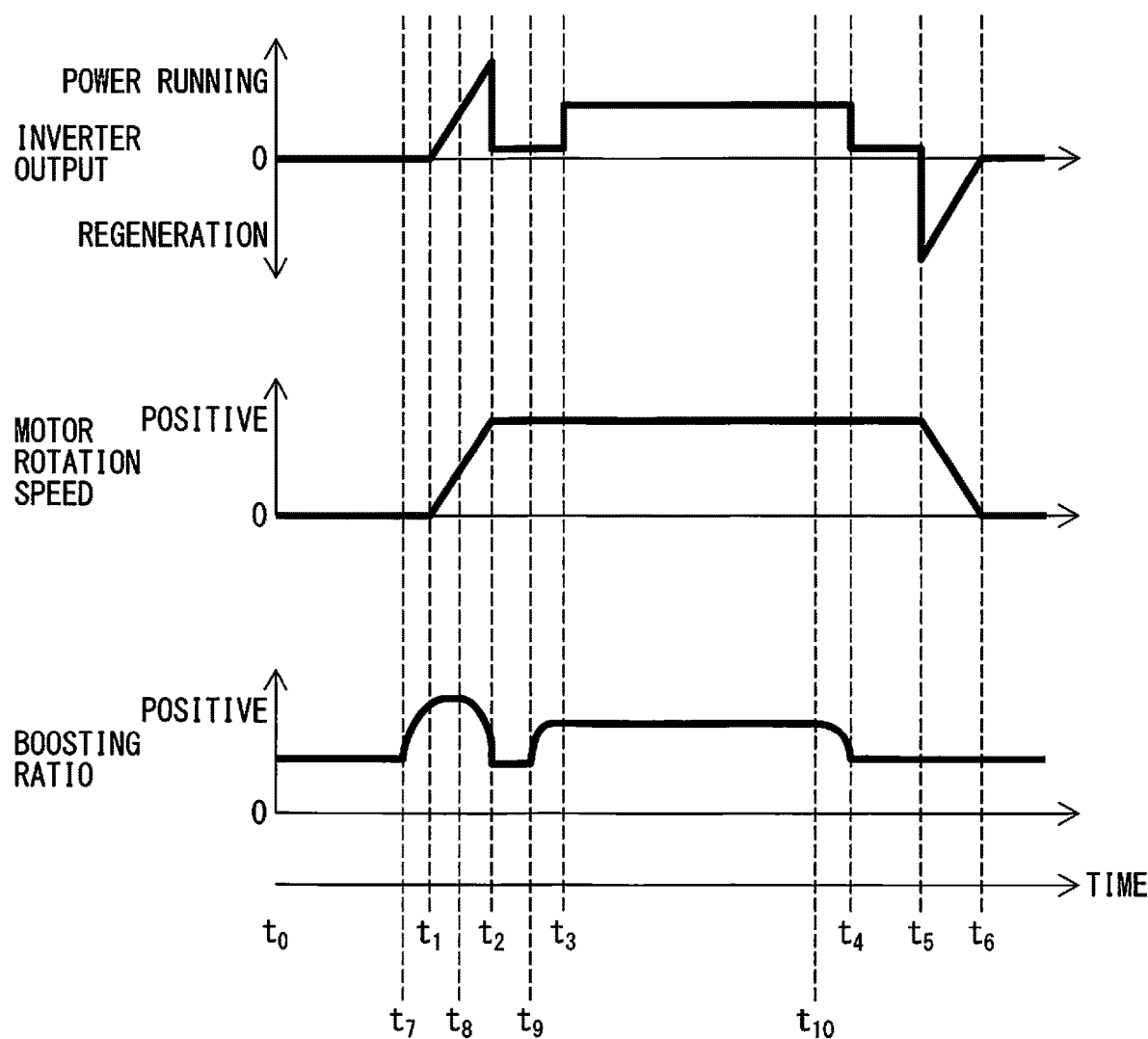
FIG. 7 is a timing chart illustrating an exemplary relationship among the inverter output (driving power requirement) involved in driving a motor, the motor rotation speed, and the boosting ratio when a motor drive device according to a third example is mounted in a cutting machine.

FIG. 7 is a timing chart illustrating an exemplary relationship among the inverter output (driving power requirement) involved in driving a motor, the motor rotation speed, and the boosting ratio when a motor drive device according to the third example is mounted in a cutting machine. The case where a cutting machine incorporating a motor drive device according to the third example is operated in the same way as in the cutting machine according to the first example illustrated in FIG. 4 described above will be taken as an example herein.

During the OFF period from time $t_0$ to time $t_1$, since the motor 3 is kept stopped, the inverter 13 may preferably supply no drive power to the motor 3. As described with reference to FIG. 6, if power failure occurs in the AC power supply 2 before and after time $t_1$ when the motor 3 starts to accelerate, since it is probable that the power for driving the motor 3 will run short, the boosting ratio control unit 14 starts control to raise the boosting ratio A, at time $t_7$ the allowable power failure time T before time $t_1$ when the motor 3 starts to accelerate. With this operation, even if power failure to settle within the allowable power failure time T occurs before and after time $t_1$ when the motor 3 starts to accelerate, since power for driving the motor 3 can be ensured, the motor 3 can start to accelerate at time $t_1$. In the interval from time $t_0$ to time $t_7$, desirably, the boosting ratio control unit 14 controls the boosting ratio A at a constant value, and the boosting ratio A is as low as possible to keep heat generated in the motor drive device 1 less.

During the acceleration period from time $t_1$ to time $t_2$, the inverter 13 increases the output to accelerate the motor 3 under the control of the inverter control unit 41. The boosting ratio control unit 14 raises the boosting ratio A accordingly. However, since the motor 3 ends its acceleration and may preferably rotate at a light load at time $t_2$, the output of the inverter 13 lowers at time $t_2$, i.e., the amount of power to be ensured in preparation for power failure can be smaller as time $t_2$ approaches. Hence, at time $t_8$ the allowable power failure time T before time $t_2$ when the motor 3 starts to rotate at a light load, the boosting ratio control unit 14 starts control to reduce the boosting ratio A. With this operation, even if power failure to settle within the allowable power failure time T occurs during the acceleration period from time $t_1$ to time $t_2$, since power for driving the motor 3 can be ensured, and especially in the interval from time $t_8$ to time $t_2$, the voltage of the DC link capacitor 12 drops upon a reduction in boosting ratio A and no excess power is stored, heat generated in the motor drive device 1 can be kept less.

During the standby period from time $t_2$ to time $t_3$, since the motor 3 has reached a rotation speed suitable for cutting, the inverter 13 keeps a low output to the degree that the motor 3 keeps the rotation speed suitable for cutting at a light load, under the control of the inverter control unit 41. The boosting ratio control unit 14 sets the boosting ratio A low accordingly. However, since cutting is started and the load of the motor 3 increases at time $t_3$, the inverter 13 keeps a high output in the interval from time $t_3$ to time $t_4$. In other words, the amount of power to be ensured in preparation for power failure may be preferably set larger as time $t_3$ approaches. Hence, at time $t_9$ the allowable power failure time T before time $t_3$ when cutting is started and the load of the motor 3 increases, the boosting ratio control unit 14 starts control to raise the boosting ratio A. With this operation, even if power failure to settle within the allowable power failure time T occurs during the standby period from time $t_2$ to time $t_3$, power for driving the motor 3 can be ensured. In addition, even if power failure to settle within the allowable power failure time T occurs before and after time $t_3$ when cutting is started, power for driving the motor 3 can be ensured.

During the machining period from time $t_3$ to time $t_4$, since the load of the motor 3 increases upon cutting, the inverter 13 keeps a high output under the control of the inverter control unit 41 to maintain the motor 3 at the rotation speed suitable for cutting. The boosting ratio control unit 14 sets the boosting ratio A high accordingly. However, since cutting has been ended and the motor 3 may preferably rotate at a light load at time $t_4$, the output of the inverter 13 lowers at time $t_4$, i.e., the amount of power to be ensured in preparation for power failure can be smaller as time $t_4$ approaches. Hence, at time $t_{10}$ the allowable power failure time T before time $t_4$ when the motor 3 starts to rotate at a light load, the boosting ratio control unit 14 starts control to reduce the boosting ratio A. With this operation, even if power failure to settle within the allowable power failure time T occurs during the machining period from time $t_3$ to time $t_4$, since power for driving the motor 3 can be ensured, and especially in the interval from time $t_{10}$ to time $t_4$, the voltage of the DC link capacitor 12 drops upon a reduction in boosting ratio A and no excess power is stored, heat generated in the motor drive device 1 can be kept less.

During the end preparation period from time $t_4$ to time $t_5$, since cutting has been ended, the load of the motor 3 is light. Therefore, the inverter 13 has its output reduced to the degree that the motor 3 keeps the rotation speed suitable for cutting at a light load, under the control of the inverter control unit 41. The boosting ratio control unit 14 sets the boosting ratio A low accordingly.

During the deceleration period from time $t_5$ to time $t_6$, the inverter 13 converts AC regenerative power generated upon deceleration of the motor 3 into DC power and returns it to the DC link under the control of the inverter control unit 41. During this period, the energy regenerated from the motor 3 is stored in the DC link capacitor 12, and the boosting ratio control unit 14 may return the energy regenerated from the motor 3 to the AC power supply 2 via the PWM converter 11 by maintaining or reducing the boosting ratio A, or may store the energy regenerated from the motor 3 in the DC link capacitor 12 by increasing the boosting ratio A.

The operation of the boosting ratio control unit 14 during the OFF period from time $t_6$ onward is the same as that during the OFF period from time $t_0$ to time $t_7$.

In the example illustrated in FIG. 7, the output of the inverter 13 is considerably switched at times $t_1$, $t_2$, $t_3$, $t_4$, $t_5$, and $t_6$ depending on the state of the motor 3 in the cutting machine, while the control of the boosting ratio A by the boosting ratio control unit 14 is considerably switched at times $t_7$, $t_8$, $t_9$, and $t_{10}$ ahead of switching of the output of the inverter 13. In this manner, in the third example, the boosting ratio A is controlled upon outguessing of the temporal change in output $P_i(t)$ of the inverter 13.

As described above, according to this embodiment, an allowable power failure time T is set in advance to allow the motor 3 to be driven using AC power output from the inverter 13 during shut-off of supply of DC power from the PWM converter 11 to the DC link due to power failure in the AC power supply 2, and the boosting ratio control unit 14 controls the boosting ratio A so that even if power failure occurs in the AC power supply 2 and supply of DC power from the PWM converter 11 to the DC link is cut off, power in an amount sufficient to drive the motor 3 during at least the allowable power failure time T is stored in the DC link capacitor 12. Therefore, even if supply of DC power from the PWM converter 11 to the DC link is cut off due to power failure, as long as the period of time in which the supply of DC power is cut off is equal to or shorter than the allowable power failure time T, the motor 3 can be driven using AC power output by converting the DC power stored in the DC link capacitor 12 by the inverter 13. The allowable power failure time T can be freely set by the user. The boosting ratio control unit 14 controls the boosting ratio A, based on the length of the set allowable power failure time T, so that even if supply of DC power from the PWM converter 11 to the DC link is cut off due to power failure in the AC power supply, power in an amount sufficient to drive the motor 3 is stored in the DC link capacitor 12. Heat generated in the motor drive device 1 due to the switching losses and the resistance components can be kept less by dynamically changing the boosting ratio A by the boosting ratio control unit 14. Therefore, unlike the conventional techniques, since the capacitance of the DC link capacitor may not be preferably increased or no uninterruptible power supply may be preferably added to prolong the allowable power failure time T and keep heat generated due to resistance components less, a motor drive device 1 including a low-cost, small-footprint PWM converter 11, having a long allowable power failure time T and generating little heat due to the switching losses and the resistance components of the motor drive device 1, can be realized.

The allowable power failure time T can be freely set by the user, but if unexpected power failure occurs past the allowable power failure time T, the motor 3 may stop, so the motor 3, the motor drive device 1 that drives the motor 3, and a device incorporating the motor drive device 1 may break down or any workpiece may suffer damage. To overcome this situation, as another embodiment of the present disclosure, when the power failure in the AC power supply 2 remains even after the elapse of the allowable power failure time from the point of time when the power failure is detected by the power failure detection unit 16, protective operations for preventing damage to the motor 3 and a machine and a member including the motor 3 may be performed.

Figure 8:
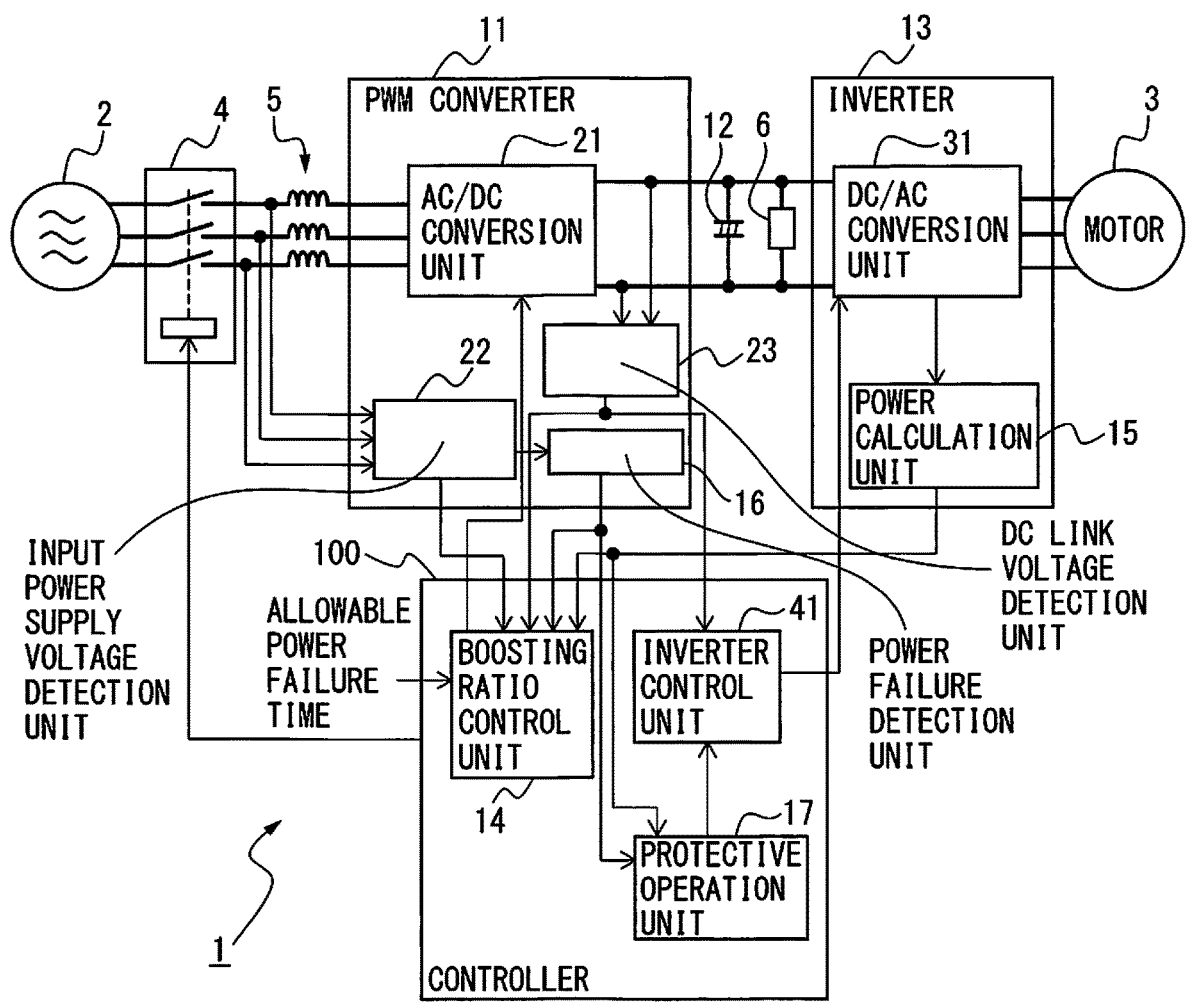
FIG. 8 is a block diagram illustrating a motor drive device according to another embodiment.

FIG. 8 is a block diagram illustrating a motor drive device according to another embodiment. In this embodiment, with respect to the embodiment described with reference to FIGS. 1 to 7, the device further includes a protective operation unit 17 which performs protective operations for preventing damage to the motor 3, a machine including the motor 3, and a member (e.g., a tool or a workpiece) connected to the motor 3, when the power failure in the AC power supply 2 remains even after the elapse of the allowable power failure time T from the point of time when the power failure is detected by the power failure detection unit 16.

For example, the boosting ratio control unit 14 controls the boosting ratio A to store in the DC link capacitor 12, power in an amount obtained by adding the amount of power $W_p$ [J] involved in performing the protective operations of the motor 3 by the protective operation unit 17 to the amount of power $W_m$ [J] stored in the DC link capacitor 12 presented in equation (2), as the following equation (13).

[Equation 13]

$$Wm = \frac{1}{2} \times C \times (V_2^2 - V_1^2) + Wp \ [J] \qquad (13)$$

As another example, the boosting ratio control unit 14 controls the boosting ratio A to store in the DC link capacitor 12, power in an amount obtained by substituting the voltage $V_4$ of the DC link capacitor 12 when power in an amount involved in performing the protective operations of the motor 3 by the protective operation unit 17 is stored in the DC link capacitor 12 for the minimum value $V_1$ [V] of the DC voltage of the DC link capacitor 12 involved in driving the motor 3, in the amount of power $W_m$ [J] stored in the DC link capacitor 12 presented in equation (2), as the following equation (14).

[Equation 14]

$$Wm = \frac{1}{2} \times C \times (V_2^2 - V_4^2) \ [J] \qquad (14)$$

When power failure occurs past the allowable power failure time T, the protective operation unit 17 instructs the inverter control unit 41 to cause the motor 3 to perform protective operations for preventing damage to the motor 3, a machine including the motor 3, and a member (e.g., a tool or a workpiece) connected to the motor 3. In response to this instruction, the inverter control unit 41 controls the inverter 13 to convert the DC power stored in the DC link capacitor 12 into AC power and supply it to the motor 3, causes the motor 3 to perform various protective operations for preventing damage to the motor 3 itself, a machine including the motor 3, and a member (e.g., a tool or a workpiece) connected to the motor 3, and then stops the operation of the motor 3. Examples of the protective operations may include a retraction operation and a safety stop operation for preventing damage to a machine including the motor 3, a tool connected to the motor 3, and a workpiece machined by the tool.

Since other circuit components are the same as the circuit components illustrated in FIG. 1, the same reference numerals denote the same circuit components, and a detailed description thereof will not be given.

According to one aspect of the present disclosure, a motor drive device including a low-cost, small-footprint PWM converter, having a long allowable power failure time and generating little heat due to the switching losses of the PWM converter and the inverter and the resistance components on the DC link, can be realized.

The invention claimed is:

1. A motor drive device comprising:
 a PWM converter configured to convert AC power supplied from an AC power supply into DC power by PWM control and supply the DC power to a DC link;
 a DC link capacitor which is provided in the DC link and configured to store the DC power;
 an inverter configured to convert the DC power in the DC link into AC power for motor driving and output the AC power; and
 a boosting ratio control unit configured to control a boosting ratio as a ratio of a value of a DC voltage output from the PWM converter to a peak value of an AC voltage input from the AC power supply, to allow a motor to be driven using the AC power output by converting the DC power stored in the DC link capacitor by the inverter during shut-off of supply of the DC power from the PWM converter to the DC link.

2. The motor drive device according to claim 1, wherein the boosting ratio control unit controls the boosting ratio, based on an allowable power failure time set in advance as a period of time in which the motor is allowed to be driven using the AC power output from the inverter during shut-off of supply of the DC power from the PWM converter to the DC link due to power failure in the AC power supply.

3. The motor drive device according to claim 2, further comprising:
 a power calculation unit configured to calculate a driving power requirement as an amount of DC power involved in driving the motor during the allowable power failure time,
 wherein the boosting ratio control unit controls the boosting ratio so that an amount of the DC power stored in the DC link capacitor and available to drive the motor during the allowable power failure time is larger than the driving power requirement.

4. The motor drive device according to claim 3, wherein the power calculation unit calculates the driving power requirement, based on an output of the inverter during the allowable power failure time.

5. The motor drive device according to claim 3, wherein the power calculation unit calculates the driving power requirement, based on a total volume of motor output during the allowable power failure time.

6. The motor drive device according to claim 2, further comprising:
 a power failure detection unit configured to detect power failure in the AC power supply; and
 a protective operation unit configured to perform a protective operation for preventing damage to the motor, a machine comprising the motor, and a member connected to the motor, when the power failure in the AC power supply remains even after elapse of the allowable power failure time from a point of time when the power failure is detected by the power failure detection unit.

* * * * *